United States Patent
Dayanand et al.

(10) Patent No.: US 9,111,371 B2
(45) Date of Patent: Aug. 18, 2015

(54) WORKFLOW SYSTEM FOR 3D MODEL CREATION

(75) Inventors: Sriram Dayanand, Toronto (CA); Michael Carey Daum, Toronto (CA); Christopher Cheung, Mississauga (CA)

(73) Assignee: AUTODESK, INC., San Rafael, CA (US)

( * ) Notice: Subject to any disclaimer, the term of this patent is extended or adjusted under 35 U.S.C. 154(b) by 182 days.

(21) Appl. No.: 11/244,005

(22) Filed: Oct. 6, 2005

(65) Prior Publication Data
US 2007/0080960 A1     Apr. 12, 2007

(51) Int. Cl.
| G06T 17/00 | (2006.01) |
| G06T 17/20 | (2006.01) |
| G06T 17/30 | (2006.01) |
| G06T 19/00 | (2011.01) |
| G06T 11/20 | (2006.01) |

(52) U.S. Cl.
CPC ............... *G06T 19/00* (2013.01); *G06T 11/203* (2013.01); *G06T 2219/2021* (2013.01)

(58) Field of Classification Search
USPC ............................ 345/420, 419, 582; 715/849
See application file for complete search history.

(56) References Cited

U.S. PATENT DOCUMENTS

| 4,858,150 | A  * | 8/1989  | Aizawa et al. ................. 345/420 |
| 5,237,647 | A  * | 8/1993  | Roberts et al. ................. 345/419 |
| 5,701,403 | A  * | 12/1997 | Watanabe et al. ............. 345/419 |
| 6,348,924 | B1 * | 2/2002  | Brinsmead .................... 345/441 |
| 6,556,195 | B1 * | 4/2003  | Totsuka et al. ................ 345/419 |
| 6,590,573 | B1 * | 7/2003  | Geshwind ..................... 345/419 |
| 6,628,279 | B1 * | 9/2003  | Schell et al. .................. 345/420 |
| 6,639,592 | B1   | 10/2003 | Dayanand et al. |
| 6,762,778 | B1 * | 7/2004  | Golibrodski et al. ......... 715/849 |
| 7,236,178 | B2 * | 6/2007  | Maillot et al. ................ 345/582 |
| 2003/0048277 | A1 * | 3/2003 | Maillot et al. ................ 345/582 |
| 2005/0062738 | A1 * | 3/2005 | Handley et al. .............. 345/419 |
| 2006/0082571 | A1 * | 4/2006 | McDaniel ..................... 345/419 |

OTHER PUBLICATIONS

International Search Report, mailed Apr. 18, 2008 and issued in corresponding International Patent Application No. PCT/US06/18771.
International Preliminary Report on Patentability mailed on Jun. 12, 2008 and issued in corresponding International Patent Application No. PCT/US2006/018771.
International Search Report mailed on Sep. 8, 2008 and issued in corresponding International Patent Application No. PCT/US06/18771.

(Continued)

*Primary Examiner* — Phi Hoang
(74) *Attorney, Agent, or Firm* — Artegis Law Group, LLP

(57) ABSTRACT

A 3D modeling workflow system is disclosed that allows the user to create multiple 2D planes or paint canvases in the 3D scene each having a position and orientation. These 2D planes can be arbitrarily positioned in the 3D scene and can contain a combination of paint and model construction geometry. The construction geometry can span multiple 2D planes. The user is allowed to sketch on the planes using paint and create curve geometry in and between the planes using the sketches as a reference. Collectively the 2D planes allow a 3D object to be represented with different types of input where portions of the object are drawn in by paint and other or the same portions are composed of geometry. The user can swap between painting on the 2D planes and creating model geometry as needed.

10 Claims, 14 Drawing Sheets

(56) References Cited

OTHER PUBLICATIONS

Japanese Office Action dated Jul. 12, 2011 for corresponding Japanese Patent Application No. 2008-534516.

Japanese Office Action dated Dec. 6, 2011 for corresponding Japanese Patent Application No. 2008-534516.

* cited by examiner

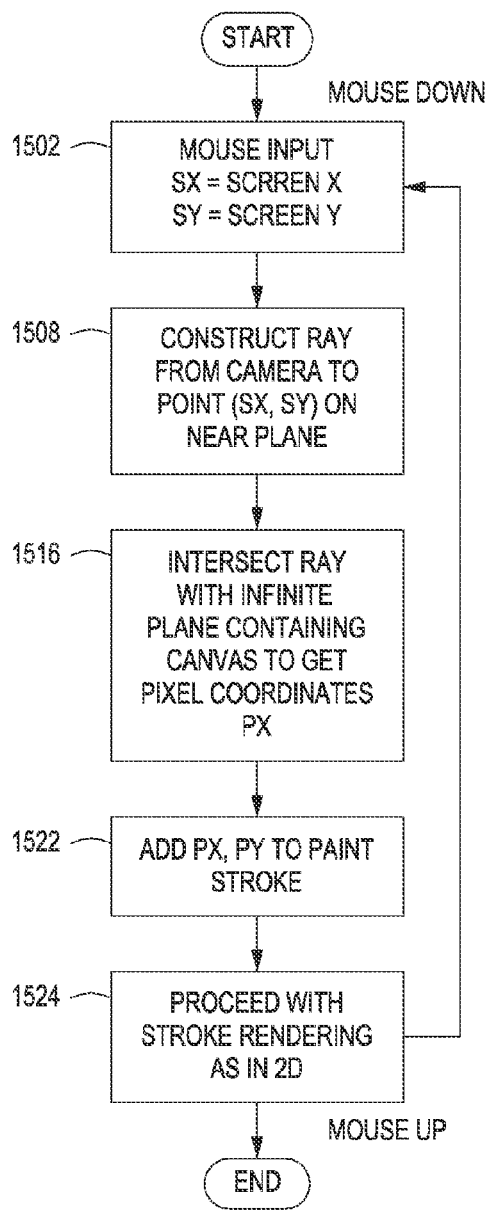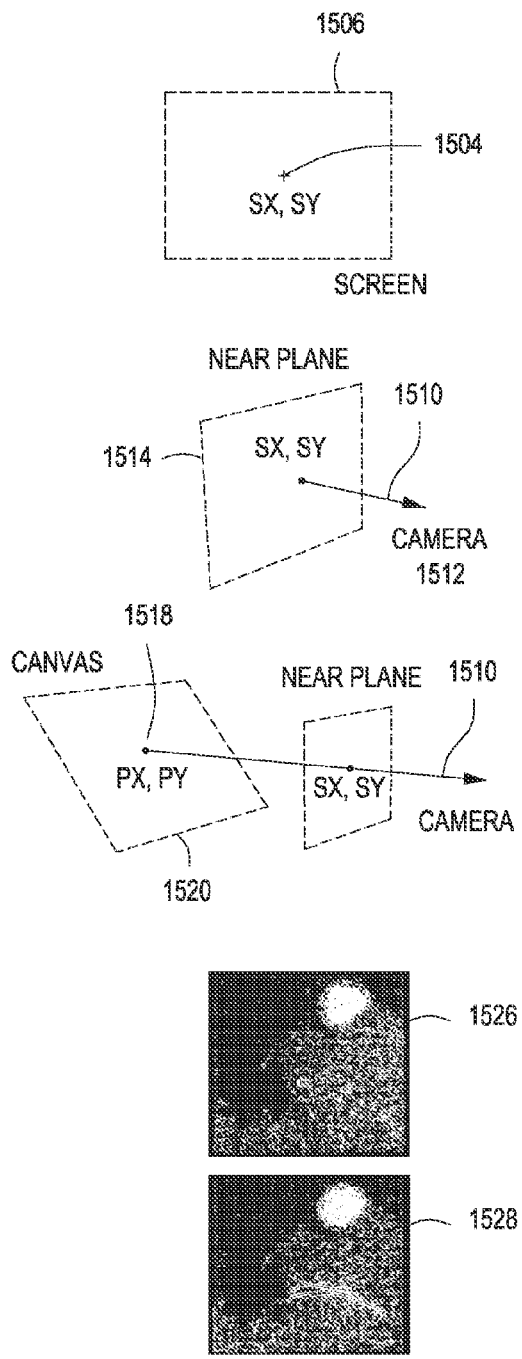
FIG. 15

WORKFLOW SYSTEM FOR 3D MODEL CREATION

BACKGROUND OF THE INVENTION

1. Field of the Invention

The present invention is directed to workflow system for 3D model creation.

2. Description of the Related Art

In today's modeling environment there is a need for rapid 3D shape generation and design for a 3D modeling system. Conventional 3D modeling tools require fairly high precision, detail and attention to generate shapes. Conversely, sketching using a paint brush or pencil allows for very fluid and approximate shape exploration. However, once a 2D sketch is accepted, it is difficult to translate it into a 3D model.

Solutions to today involve a simplistic approach where a 2D image plane serves as a backdrop reference for constructing 3D models in front of the image plane. While some reference can be used, it does not allow for rapid shape exploration. Also, often one or two reference image planes are used. Alternatively, state-of-the-art 3D modeling applications allow one or more construction planes to assist the user in placing or aligning 3D geometry in the scene. The motivation behind these construction planes is to make 3D geometry construction more efficient and have no notion of combining inking (i.e., sketching) and 3D geometry in a single plane.

What is needed is a system that combines the sketchy and rapid nature of 2D painting with the precision and placement of 3D modeling. Such a needed system would bridge the gap between rapid concept sketching and precise 3D modeling. Such a needed hybrid system would leverage the strengths of both approaches. This type of hybrid workflow combining the benefits of rapid sketching with the ability to translate the concepts more readily into precise 3D modeling allows users "stay in one tool" to progress through "ideation" to more robust 3D designs.

SUMMARY OF THE INVENTION

It is an aspect of the present invention to provide a system that allows 2D sketching and 3D geometry creation to be performed in concert to develop a 3D model.

It is another aspect of the present invention to encourage shape exploration by the use of ink and a drawing on paper analogy while at the same time providing a geometry construction capability that works with the drawing.

The above aspects can be attained by a 3D modeling workflow system is disclosed that allows the user to create multiple 2D planes in the 3D scene each having a position and orientation. These 2D planes can contain a combination of paint and model construction geometry. The construction geometry can span multiple 2D planes. Collectively the 2D planes allow a 3D sketch of a 3D object where portions of the object are drawn in by paint and other portions are composed of geometry. The user can swap between painting on the 2D planes and creating model geometry as needed during development.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 15 shows the operations of making a paint stroke.

DETAILED DESCRIPTION OF THE PREFERRED EMBODIMENTS

Figure 1:
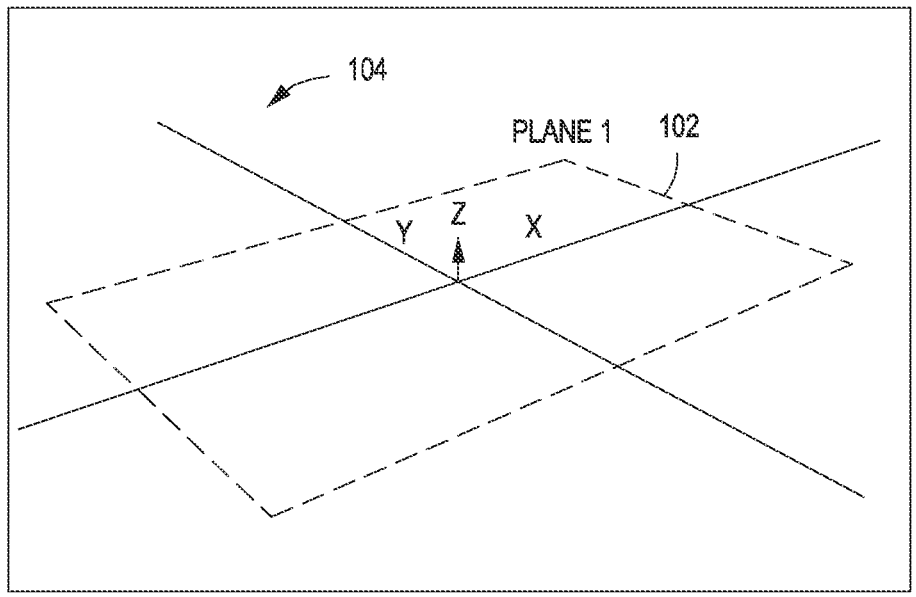
FIG. 1 depicts the creation of a plane.

The present invention is a workflow system that allows a user to sketch the outlines of an object, such as the design of a car, using conventional input tools, such as a mouse, a touch screen stylus, a tablet, etc. in a model space and then use that sketch as a reference to create model geometry for the object in the model space. The user sketches during a paint operation and converts to a geometry operation to create the model geometry. The user can switch back and forth between the drawing operation and the geometry operation by selecting appropriate tools, such as a pencil tool for drawing and a CV or Edit Point Curve Tool for making a geometry curve stroke, allowing the user to sketch a few lines, create geometry for the lines, then sketch some more lines, etc. During the paint operation sketching or drawing, the user uses the typical drawing tools and functions available in a conventional drawing system such as in the StudioTools® available from Alias Systems Corp. The sketching is performed on planes or two-dimensional (2D) canvases that can be arbitrarily positioned or repositioned in the three-dimensional (3D) model space. During the creating of model geometry in the geometry operation positions geometric points or curves in the 3D model space, using the sketches as a reference and using the conventional tools and functions for geometry creation found in a system such as StudioTools®.

The user of the present invention can start with the painting or sketch operation (although a canvas can be created during other operations) and creates a sketch plane or canvas 102 on an infinite plane 104 in the 3D model space of the FIG. 1. This plane 102 can have arbitrary dimensions as needed by the user. This plane can be arbitrarily positioned by the user designating the plane 102 and dragging it into a desired position and orientation. The plane 102 is shown perspectively and in coincidence with the origin of the model space but could be created at any position in the model space.

Figure 2:
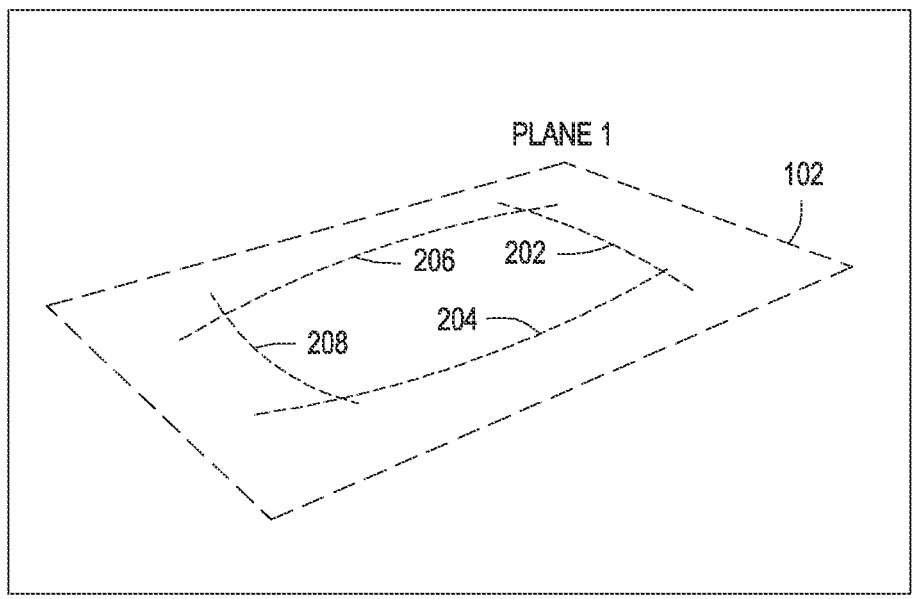
FIG. 2 shows a user drawing/painting on a plane or sketch canvas.

The user then can draw on the plane 102 by selecting a paint tool and making painting/drawing strokes where FIG. 2 shows the plane 102 with four paint strokes 202-208 having been made on the plane 102. As can be seen, the plane or canvas 102 is treated much like a piece of paper upon which the user can draw. This canvas 102 could even be positioned so that it is perpendicular to the users view point, so that it appears like a piece of paper positioned on the display screen, reinforcing the paper sketching analogy for the user.

Figure 3:
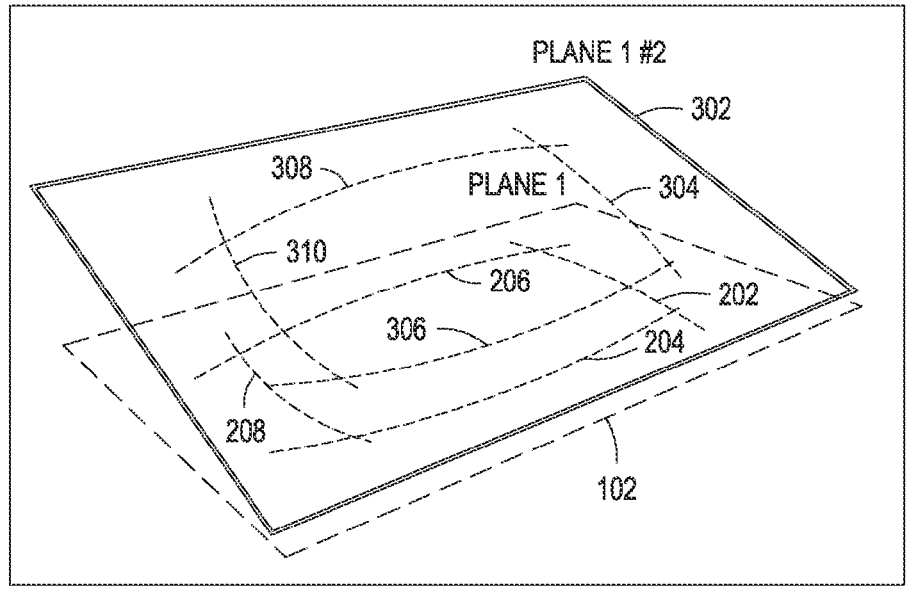
FIG. 3 illustrates that a new plane can be created by duplication and then be moved.

The user, while in the drawing mode, can create another plane upon which to sketch. This plane can be empty as in FIG. 1 or the user can create a copy 302 as depicted in FIG. 3. A duplicate of a plane 302 also includes duplicates 304-310 of the paint stokes 202-208 of the plane 102 being copied. In FIG. 3, the user has positioned or moved the duplicate plane 302 above and at an angle with respect to original plane 102.

Figure 4:
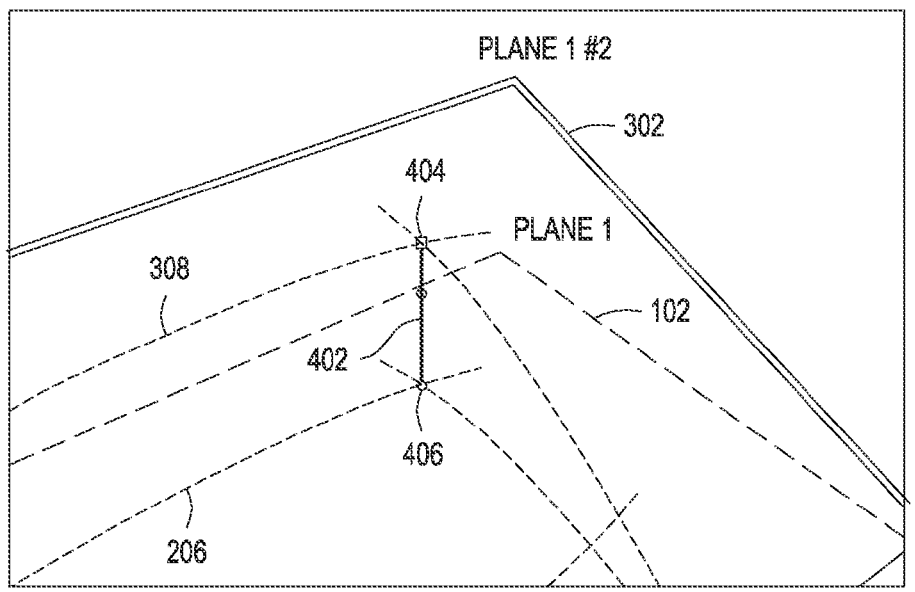
FIG. 4 shows creation of a model geometry curve connecting planes.

When the user is ready to use the sketch(es) as a reference for model geometry creation, the user switches the system into a geometry operation by, for example, conventional activation of a tool for drawing geometry curves, such as cv curve, edit point curve, blend curve, or sketch curve. In this operation, the user can specify the parameters of a model curve. FIG. 4 shows a geometry curve 402 the user has created by snapping the curve to intersection points 404 and 406 of the planes 302 and 102. This particular operation has created geometry connecting the two planes 102 and 302.

Figure 5:
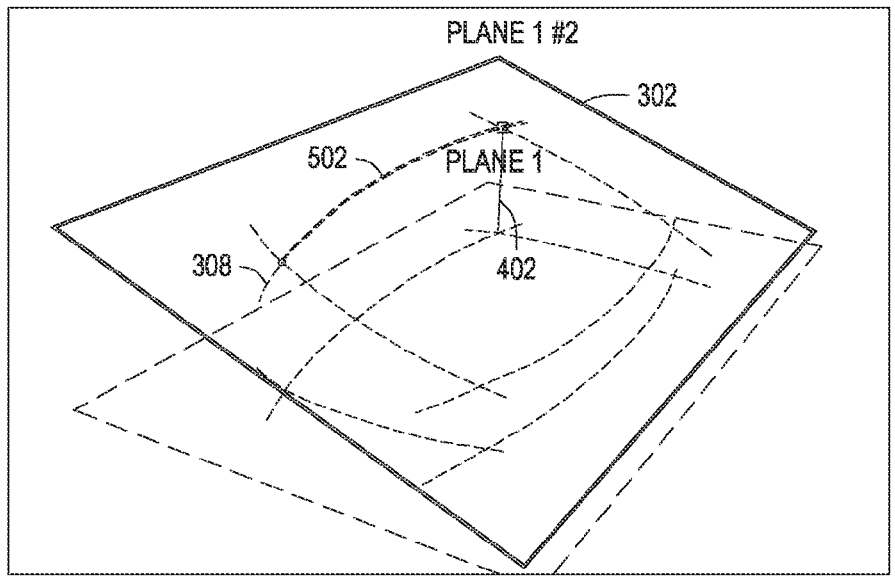
FIG. 5 show creating geometry directly on a plane.

The user can also create geometry coincident with or directly on a plane paint stroke as depicted in FIG. 5 where the user has specified a model geometry curve 502 along part of the paint stroke 308 in plane canvas 302.

Figure 6:
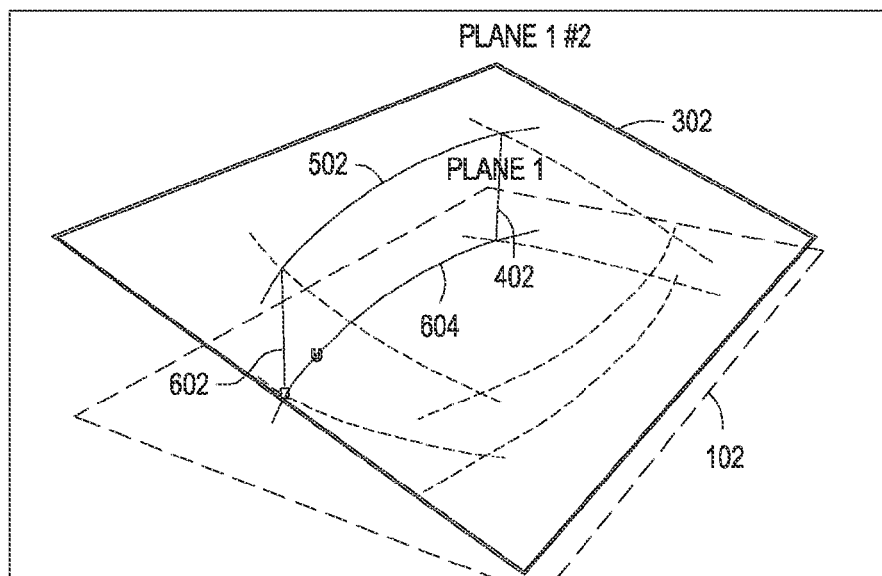
FIG. 6 depicts connecting curves to form a curve network.

FIG. 6 shows, while in the geometry mode, the creation of curves 602 and 604 by the user where curve 602 connects between planes 102 and 302 and curve 604 in plane 102. The set of curves 402, 502, 602 and 604 form a network of curves.

Figure 7:
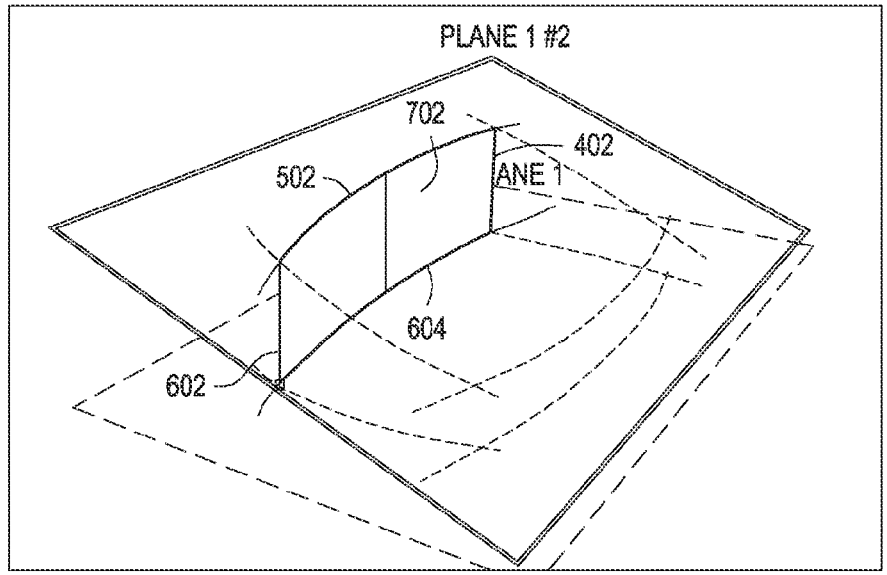
FIG. 7 illustrates surface geometry being automatically created for a curve network.

While in the geometry mode, the user can use a network of curves, such as curves 402, 502, 602 and 604 to create surface geometry 702 as shown in FIG. 7.

Figure 8:
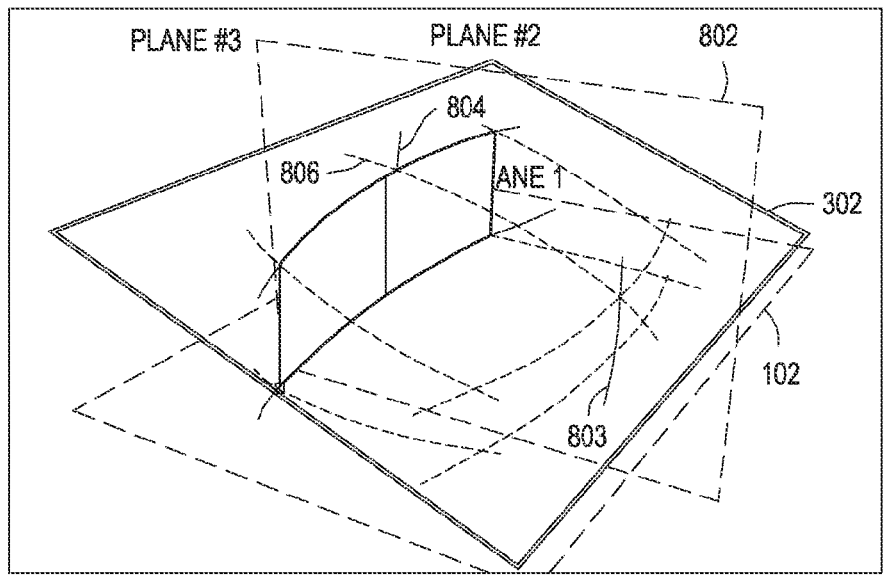
FIG. 8 shows a new plane being created that intersects the previously created planes.

As previously discussed the user can switch between the painting and geometry operations at any time. FIG. 8 shows a plane 802 created by the user after switching into the paint operation where the user has made paint strokes 804, 806 and 808 on the canvas (plane). This plane 802 has been oriented by the user relative to planes 102 and 302, so that it intersects both of these previously created planes 102 and 302. In this example, the user has created a center line profile sketch or a cross sectional sketch much as the user might do on paper to show what a model should look like in cross sectional profile.

Figure 9:
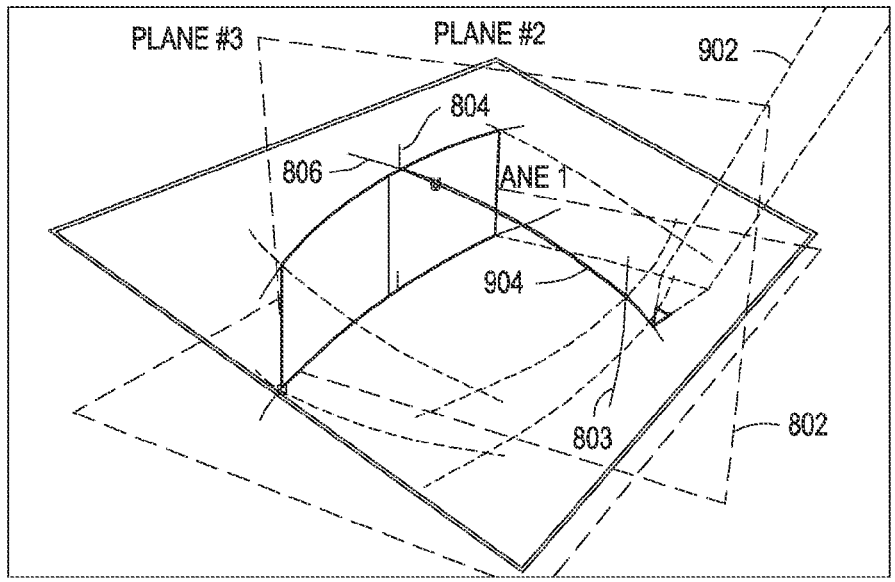
FIG. 9 shows a brush stroke on a plane creating curve geometry.

As for other sketches the user can switch to the geometry operation and create geometry using the plane 802 as a reference. FIG. 9 depicts a stylus type tool 902 creating a geometry curve 904 on the plane 802 using a brush stroke that substantially traces the paint stroke 806 previously created.

Figure 10:
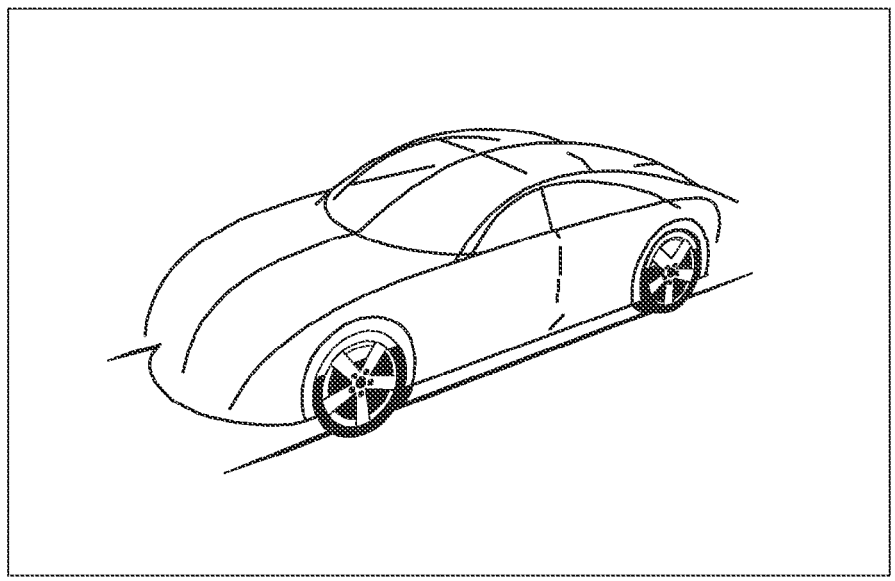
FIGS. 10, 11 and 12 show the paint strokes and planes used to crate a sketch model of a car.
Figure 11:
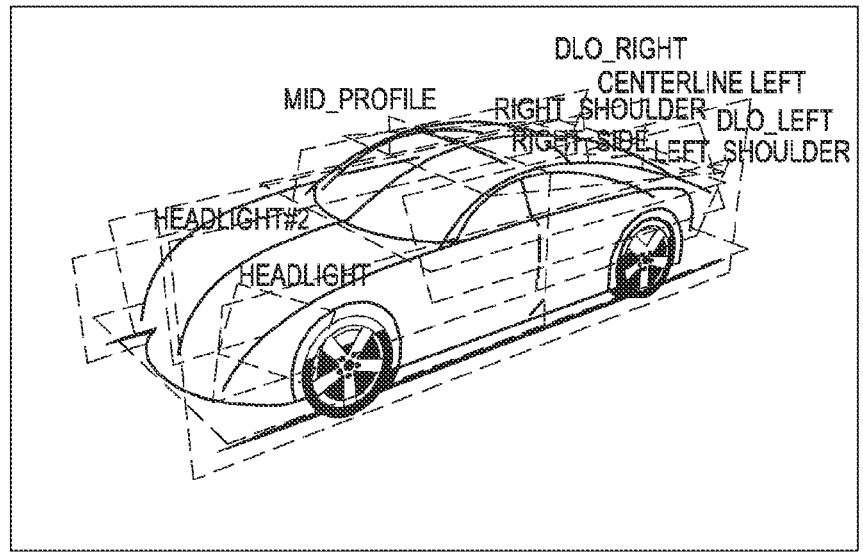
Figure 12:
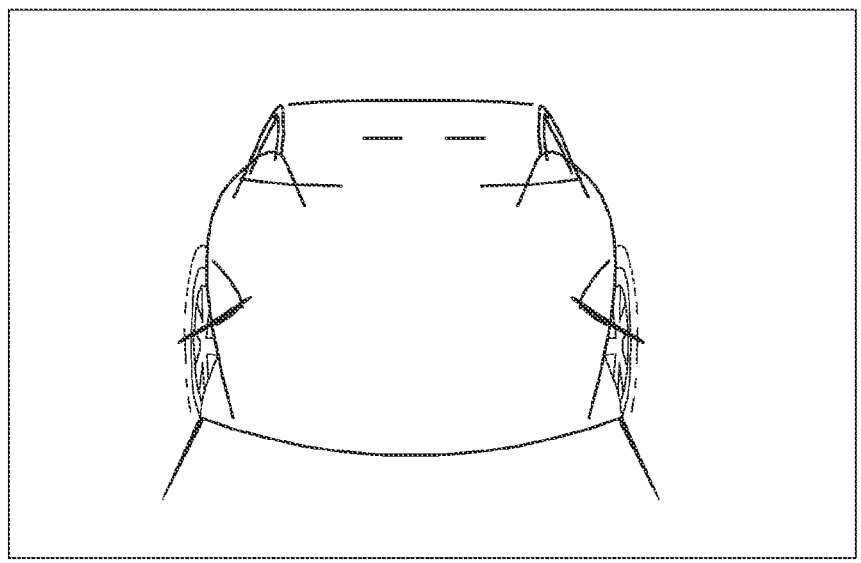

The user can continue this process of building up a model one or more planes at a time by creating paint stroke reference planes that can be used to create model geometry. FIG. 10 shows the paint stokes created by a user in this way to sketch a model of a car where the display of the planes on which the strokes have been made is disabled. FIG. 11 shows this same sketch model with the display of the planes enabled. As can bee seen, the planes are oriented as the user might orient them when conceptualizing the basics of the car being modeled. FIG. 12 shows the same model oriented with the front of the model car facing the user again showing the relationship between the canvas planes. In such a changed view, it is possible for the planes and the drawings, geometry, etc, to be in an edge-on orientation where the drawn lines may become invisible.

Figure 13:
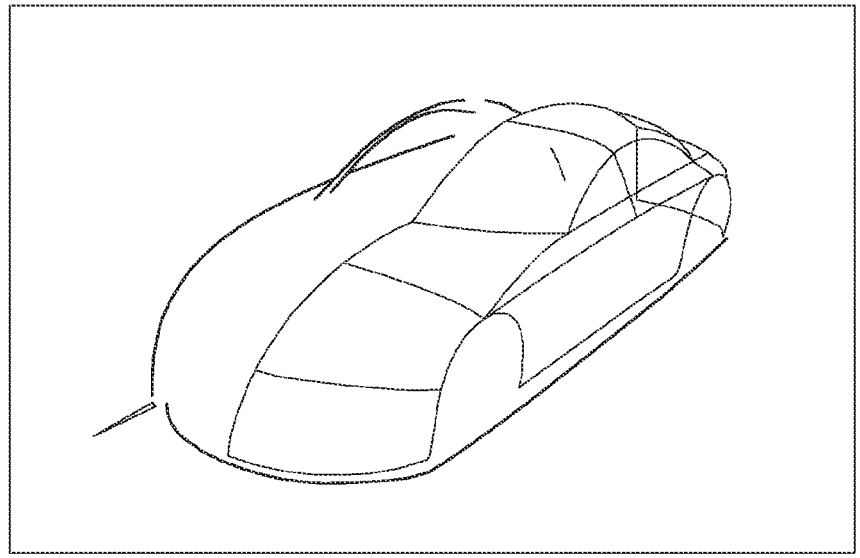
FIG. 13 depicts a curve network created using the reference sketches of FIGS. 10-12.
Figure 14:
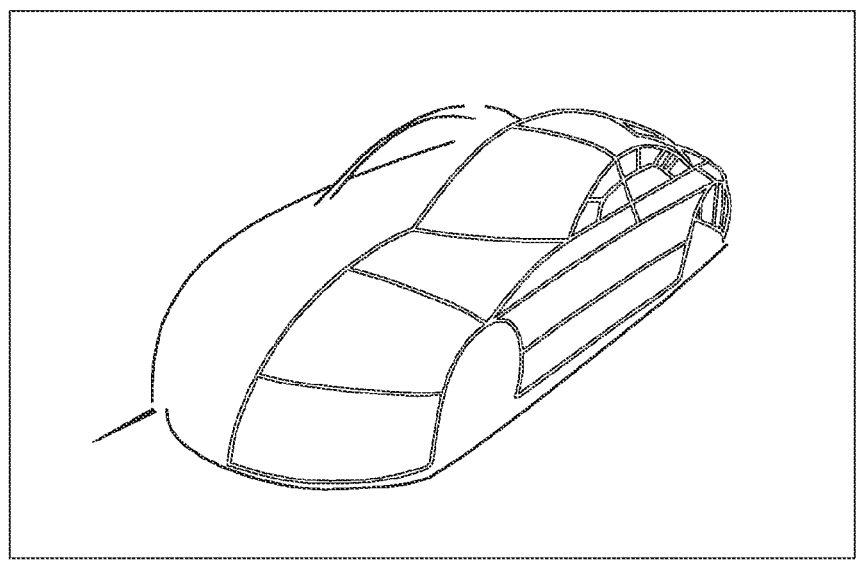
FIG. 14 shows surface geometry created for the curve network of FIG. 13.

FIG. 13 shows the geometry created by the user for one side of the car by connecting points and specifying curves. This curve network, as also previously discussed, can be used to automatically make model surfaces as depicted in FIG. 14.

The above discussed workflow operations are effected by a set of processes as discussed below with respect to FIGS. 15-18. As previously discussed a number of actions, such as the creation of a plane or canvas, are performed using the conventional tools of an available system such as StudioTools®. Such conventional operations will not be described. In addition other operations that are effected during the processes discussed below and performed automatically by a system such as StudioTools®, like creating a rendered paint stroke or snapping a brush stoke to a curve will also not be discussed in detail. To help in visualizing what is happening in the processes discussed below various perspective views of the relationships involved are also shown in the figures.

FIG. 15 shows the process operations that occur when a user makes a paint stoke in a 3D model space. When the system detects an input event, such as the touch of a stylus to a screen, the activation of a mouse button down event that signifies the input of a point of a paint stoke, the system inputs 1502 that position 1504 and can display is on the screen 1506 in the form of some type of cursor, such as a visible point, an arrow, etc. The system then constructs 1508 a ray 1510 from the point 1504 to a virtual camera 1512 that can represent the user viewpoint into the 3D scene through a near plane 1514 that essentially represents the display screen 1506.

At this point a target canvas is selected as follows. First, the ray is intersected with the finite rectangles in world space representing the existing canvases. Of the intersected canvases, the one closest to the eye is selected for drawing. If no intersection occurs, then the ray is intersected with the infinite plane containing the last used canvas. If this intersection occurs, then this canvas is selected for drawing. If not, then a new canvas is created which fills the screen and is perpendicular to the view direction. Other canvas selection techniques can be used, such as choosing the closest intersected plane to the eye point along a pick ray or having the user choose explicitly from a list of planes".

The system then projects the ray 1510 into the scene determine 1516 an intersection 1518 of the ray with the canvas or drawing plane 1520 in the scene. This point is a point with 2D coordinates that correspond to the 2D position of the point on the intersected canvas plane. This point is then added 1522 to the list of points for a paint stroke. As long as the user is inputting a paint stroke 1524, such as by moving the mouse and holding the paint activation button down, points are added to the list and would appear in the scene 1526 if the system was enabled to show the points of the stroke as it is being made. At the end of the brush stoke, or during the stroke, the system creates a curve in the scene 1528 corresponding to the points.

Figure 16:
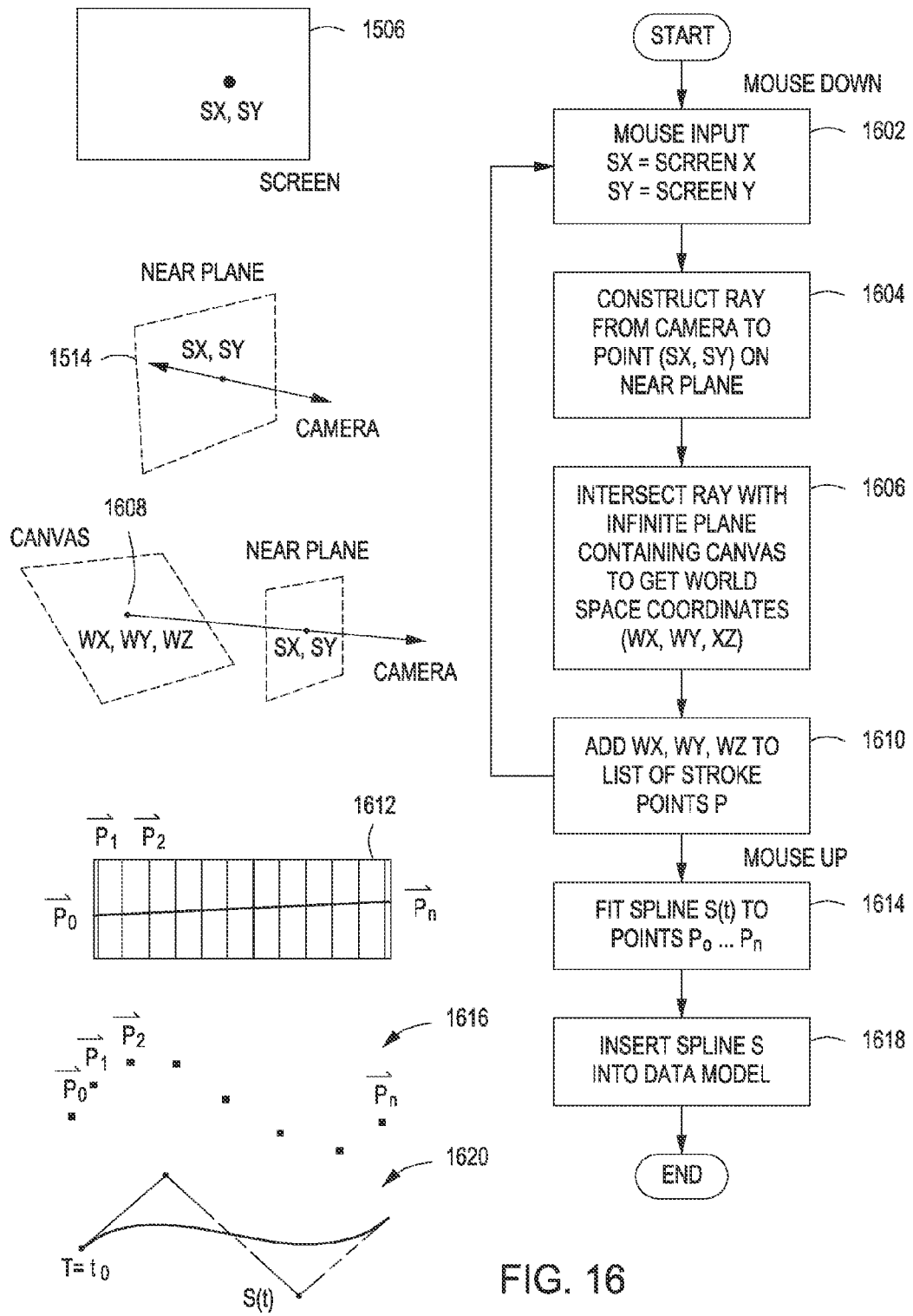
FIG. 16 illustrates geometry curve creation.

FIG. 16 depicts the operations associated with the user making a brush stroke that creates a geometry curve on a plane or canvas in the 3D model space. Like the painting operation discussed above, the system inputs 1602 the point, constructs a ray 1604, determines a target canvas as previously discussed, and determines 1606 an intersection point in the model space. However, this intersection point 1608 is the 3D intersection of the point with the plane in the world space of the model. This point is added 1610 to the list of points for this brush stroke curve. These points may appear in the scene 1612 were this display function enabled. Once the user is finished with the stroke, the system fits 1614 a spline curve to the points 1616 and then inserts 1618 that 3D curve into the 3D data model being constructed.

Figure 17:
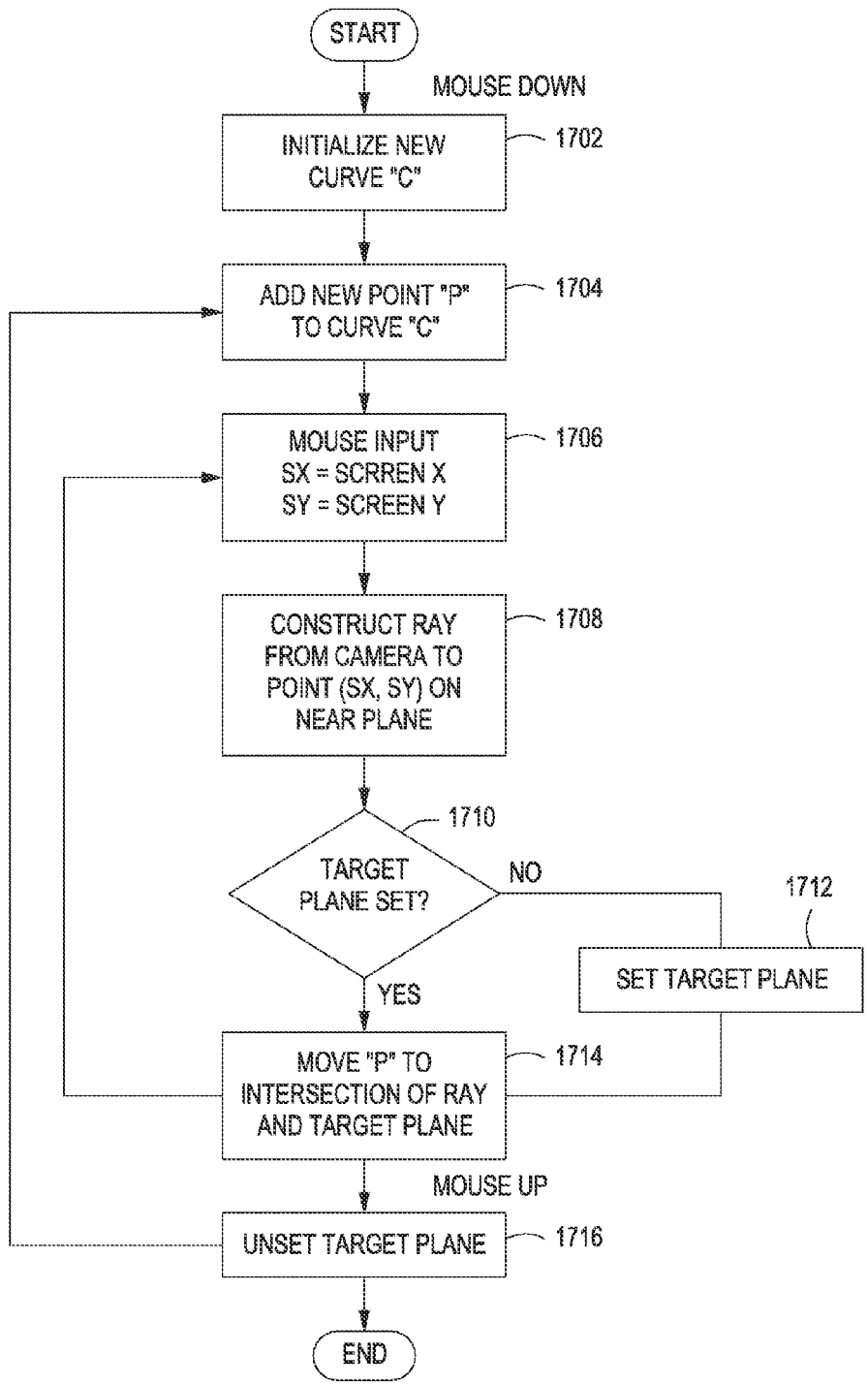
FIG. 17 shows the operations for geometry curves between canvases.
Figure 18:
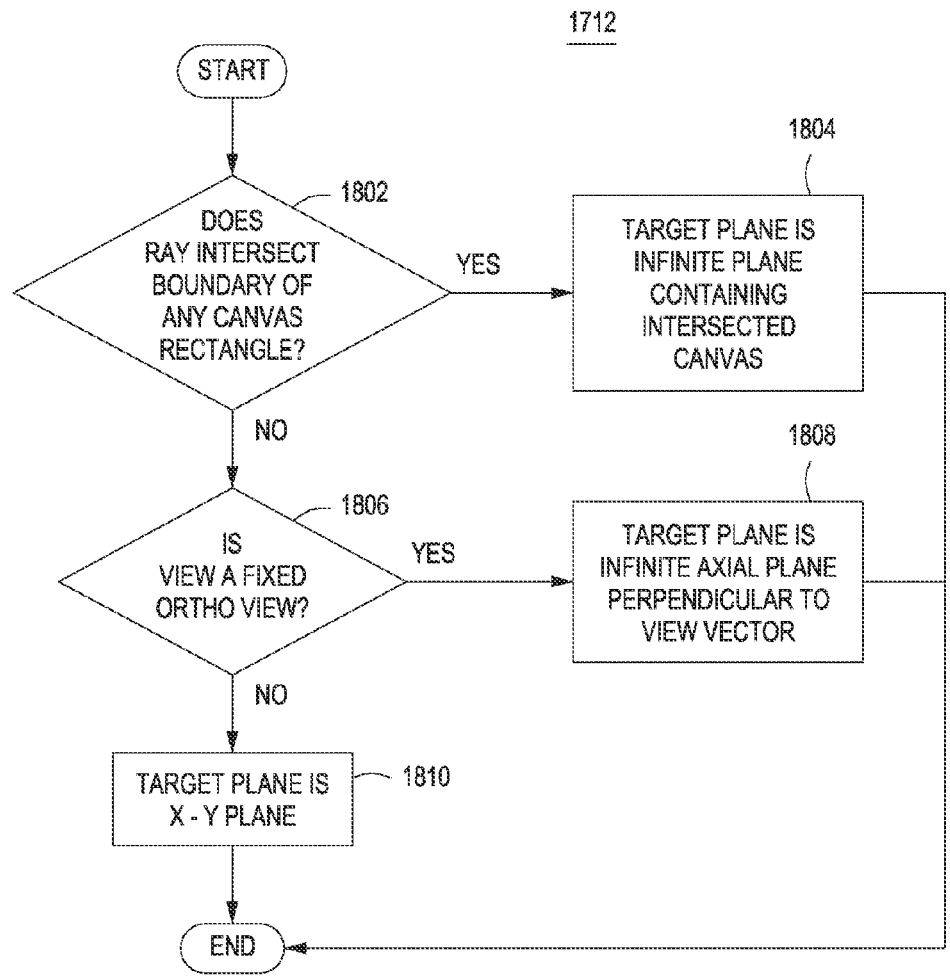
FIG. 18 shows target plane setting.

When the user is creating a curve on multiple canvases, as depicted in FIG. 17, when the user activates the curve operation by, for example, depressing an appropriate mouse button, the system initializes 1702 a new system curve C. This new curve is initially empty and a control point, p, for that curve is added 1704. This control point will be assigned a position in the 3D space depending on the plane "intended" by the user. Like previously the input 1706 point is used to construct 1708 a ray on the near plane. The system then determines 1710 if a target plane has been set, that is the user has selected or designated a plane upon which to place the point. If a plane has not been set operations of setting the plane are performed (see FIG. 18). If the plane has been set, the point is moved 1714 from the near plane to the intersection of the ray with the target plane. The moving of the control point about on the target plane in the loop 1706, 1708, 1710 and 1714 continues until the user gets it in the desired position and the mouse button is released. The target plane is then unset 1716 and, if the operation is not changed, another control point is added 1704 to the geometry curve, a target plane is selected and this point is also moved to a desired position. When the laying down of control points for the desired planes is completed, a geometry curve is placed in the model for the points.

In setting a target plane (see FIG. 18) the system determines 1802 whether the ray point of intersection (1504, 1608) intersects a boundary of a canvas rectangle. When this occurs the target plane is set 1804 as the infinite plane on which the canvas resides. That is, the user can select the desired plane upon for which a control point is to be set by touching the edge of the desired canvas. Other methods than touching the edge can be used, such as choosing the closest intersected plane to the eye point along a pick ray or having the user choose explicitly from a list of planes.

If the user does not touch the edge of a desired canvas, the system determines 1806 if the view of the system is a fixed orthogonal view. If the view is fixed the target plane is set 1801 as the plane perpendicular to the view vector (or projected ray). This is could be considered as essentially treating the display surface as a piece of paper. If the view is not set as fixed, the target plane becomes 1810 the x-y plane where the z coordinate has a zero value.

Figure 19:
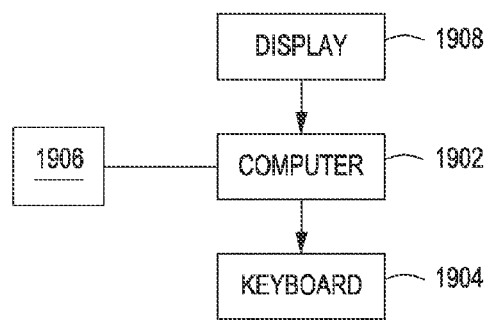
FIG. 19 illustrates hardware components.

FIG. 19 shows hardware components that can be used for the processes and workflow of the present invention. The user can input into desktop type computer 1902 operation switches and point placements, etc, using a keyboard 1904 and/or a mouse 1906 as well as other input devices, as previously mentioned. The computer displays the 3D model space along with the appropriate system GUIs with which the user interacts on the display 1908. The system includes the traditional. The system also includes permanent or removable storage, such as magnetic and optical discs, RAM, ROM, etc. on which the process and data structures of the present invention can be stored and distributed. The processes can also be distributed via, for example, downloading over a network such as the Internet and can be executed in a client server relationship.

Figure 20:
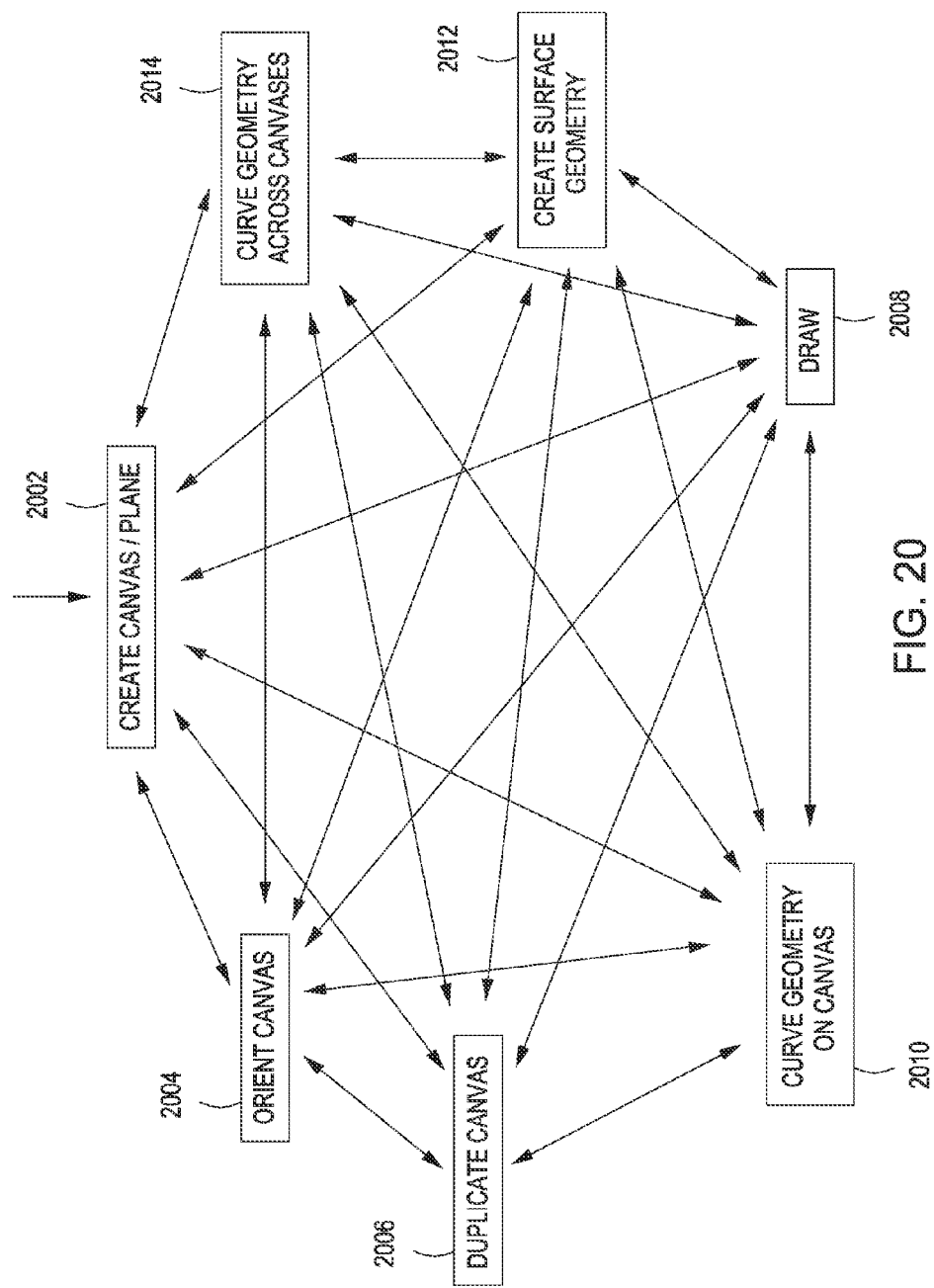
FIG. 20 illustrates the possible workflow flow.
Figure 21:
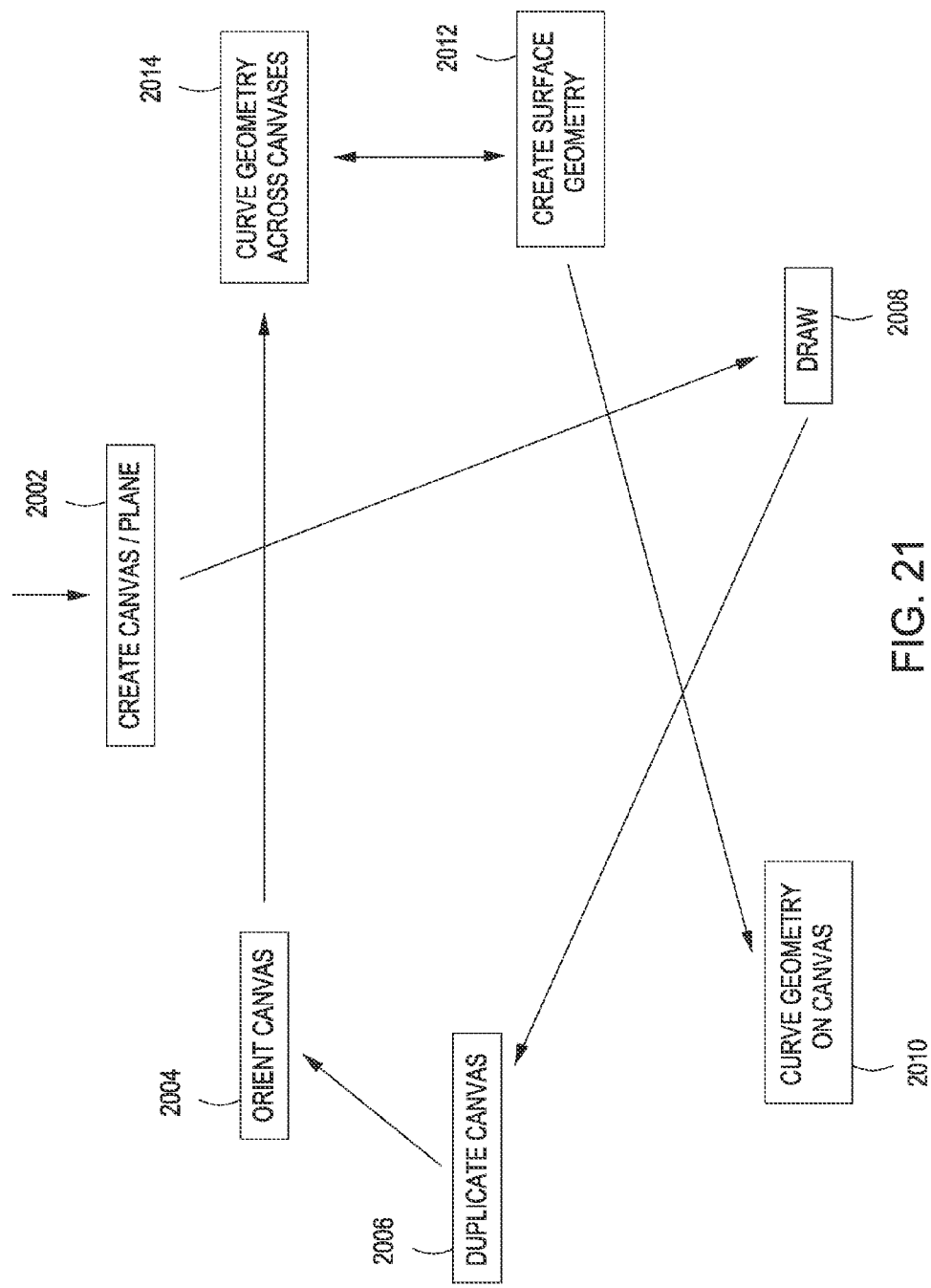
FIG. 21 shows the workflow of the example discussed with respect to FIGS. 1-9.

The processes discussed above with respect to FIGS. 15-18 allow a flexible workflow discussed previously with respect to FIGS. 1-14 and as depicted in FIG. 20. This workflow includes the typical first operation of creating 2002 a canvas or plane. In the orient (or move) operation 2004 the user moves the plane to a desired position. In the duplicate operation 2006 canvases can be duplicated. The user draws or paints on the canvases in the draw operation 2008. The geometry operations include creating 1010 a geometry curve on the canvas, creating surface geometry 2012 and creating 2014 curve geometry between or across canvases. The workflow of the example of FIGS. 1-14 is partially shown in FIG. 21 and involves flows from canvas creation 2002 (FIG. 1) through drawing 2008 on the canvas (FIG. 2) then duplicating 2006 it (FIG. 3), followed by orienting 2004 the duplicate canvas (FIG. 3), creating geometry between canvases (FIG. 4), creating surface geometry (FIG. 5) and creating curve geometry on the canvases (FIG. 6).

Figure 22:
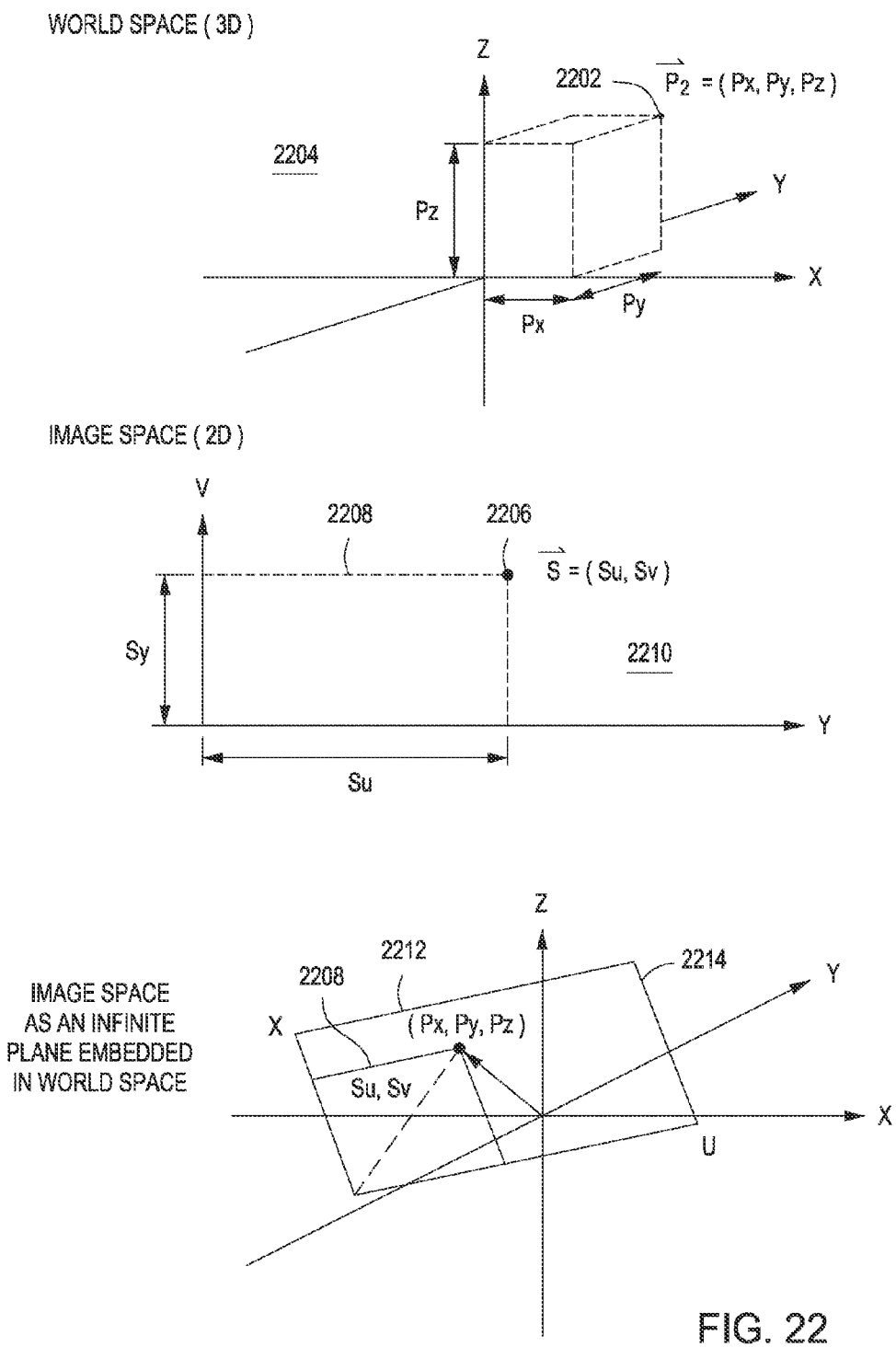
FIG. 22 shows a relationship between world and image space.

The relationship between world space and image space as used in the present invention is depicted in FIG. 22. A point which lies on the canvas plane 2208 can be described in world space 2204 as a 3D point p (2202), or in image space 2210 as a 2D point s 2206. To convert between image space and world space a set of matrices as set forth below are used.

$$M = \text{Image to World} = \begin{vmatrix} m00 & m10 & m20 & m30 \\ m01 & & & . \\ m02 & & & . \\ m03 & . & . & m33 \end{vmatrix}$$

Note, that this is a 4×4 homogeneous transform matrix.
Converting Image Space to World Space $$q = M * \begin{vmatrix} su \\ sv \\ 0.0 \\ 0.1 \end{vmatrix}$$

where q is a homogeneous point, q=qx, qy, qz, qw, su and sv are image space coordinates, 0.0 lies on the plane, 1.0 indicates a point rather than a vector is translated and px=qx/qw, py=qy/qw and pz=qz/qw.

Converting World Space to Image Space $$q = M^{-1} * \begin{vmatrix} px \\ py \\ pz \\ 1.0 \end{vmatrix}$$

where px, py, pz are world space coordinates, 1.0 indicates a point translation and su=qx/qw and sv=qy/qw.

The present invention uses a data structure that includes:
Integer Width;
Integer Height;
How many pixels high and wide in image space coordinates does the image data extend.
PixelArray image data;
The actual data forming the canvas image.
Matrix imagetoworldspace;
Transform from image to world space where the matrix M is invertible ($|M| \neq 0$)

As discussed above, the present invention is a 3D modeling workflow that allows the user to create multiple 2D planes in the 3D scene each having a position and orientation. These 2D planes can contain a combination of paint, images and construction geometry (i.e., NURBS, polylines, etc.). Construction geometry can span multiple 2D planes. Collectively the 2D planes allow a 3D sketch of a 3D object where portions of the object are drawn in by paint and other portions are composed of geometry. The workflow encourages loose shape exploration by the use of ink and 2D plane placement/orientation within the 3D scene using a drawing on paper analogy. Progressive refinement of the 3D shape from sketch to a more robust 3D NURBS model is allowed. The 2D planes are typically transparent with only the ink, paint, image or 3D geometry opaque. The planes are "2-sided" in that the content can be seen on both sides of the plane. The 2D planes can be non-planar. The construction planes can be used as guides to create geometry (e.g., snapping). The image planes can be used to define local coordinate systems for creating geometry. The basic workflow that this invention supports is the hybrid construction of a 3D shape based on a mixture of painting and 3D geometry specification utilizing whichever medium is easier to express. The 3D sketches can be done in-place, to scale, and the viewer gets a sense of 3D without having to construct geometry.

The present invention has been described with respect to the drawing surface being a 2D plane, like a sheet of paper. However, the present invention can be used with other types of canvases, such as non-planer canvases (non-planar surfaces and volumes such as spheres, cubes, cones, etc.).

The present invention has been described with respect to the drawing surface being like a piece of paper that the user can draw upon. It is also possible for the surface upon which the user is allowed to draw to be an image, such as a photograph. This image can be loaded into the system as a plane and loaded image plane used a reference for the creation of geometry. This loading can be performed conventionally as part of canvas create which will make a new canvas containing the loaded image, or the image can be loaded as a new layer in an existing canvas.

The present invention has been described with a number of different target surface/plane selection techniques. Other techniques can be used. The selection of a target plane involves the concept of "setting" a construction plane, which causes the plane to become a new ground plane. And the application, drawing or geometry creation, always targets the ground plane, which may be "set" to be the plane of a construction plane containing a canvas. Any selected plane can also be "locked" so that any operation performed in the locked state operates on that locked plane. The plane setting techniques that are used should support the workflow described herein.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of creating a 3D model of a 3D object, comprising:
   providing a 2D sketching mode for drawing sketches by:
      receiving a specification of a first 2D plane having a first position in a 3D space;
      receiving a drawing of a first sketch on the first 2D plane; and
      receiving a specification of a second 2D plane having a second position in the 3D space, wherein the second position is different from the first position, the second 2D plane comprising a second sketch; and
   providing a 3D geometry mode that uses the first sketch on the first 2D plane and the second sketch on the second 2D plane as references to produce a first 3D geometry curve and a second 3D geometry curve, the first 3D geometry curve and the second 3D geometry curve connecting the first 2D plane and the second 2D plane, wherein a 3D surface geometry of the 3D object is defined by the first sketch on the first 2D plane, the second sketch on the second 2D plane, the first 3D geometry curve, and the second 3D geometry curve.

2. The method of claim 1, wherein the second 2D plane comprises a copy of the first 2D plane that is moved to the second position in the 3D space.

3. The method of claim 1, wherein:
   the first 2D plane comprises at least two sketches intersecting at a first intersection point;
   the second 2D plane comprises at least two sketches intersecting at a second intersection point; and
   a curve tool snaps the first 3D geometry curve to the first and second intersection points.

4. The method of claim 1, wherein the 2D sketching mode and the 3D geometry mode are repeatedly switched.

5. The method of claim 1, wherein, while in 3D geometry mode, the first sketch on the first 2D plane, the second sketch on the second 2D plane, the first 3D geometry curve, and the second 3D geometry curve comprises a network of 3D curves that define the 3D surface geometry of the 3D object.

6. A non-transitory computer-readable storage for controlling a computer to execute a process for creating a 3D model of a 3D object, the process comprising:
   providing a 2D sketching mode for drawing sketches by:
      receiving a specification of a first 2D plane having a first position in a 3D space;
      receiving a drawing of a first sketch on the first 2D plane; and
      receiving a specification of a second 2D plane having a second position in the 3D space, where the second position is different from the first position, the second 2D plane comprising a second sketch; and
   providing a 3D geometry mode that uses the first sketch on the first 2D plane and the second sketch on the second 2D plane as references to produce a first 3D geometry curve and a second 3D geometry curve, the first 3D geometry curve and the second 3D geometry curve connecting the first 2D plane and the second 2D plane, wherein a 3D surface geometry of the 3D object is defined by the first sketch on the first 2D plane, the second sketch on the second 2D plane, the first 3D geometry curve, and the second 3D geometry curve.

7. The non-transitory computer readable storage of claim 6, wherein the second 2D plane comprises a copy of the first 2D plane that is moved to the second position in the 3D space.

8. The non-transitory computer readable storage of claim 6, wherein:
   the first 2D plane comprises at least two sketches intersecting at a first intersection point;
   the second 2D plane comprises at least two sketches intersecting at a second intersection point; and
   a curve tool snaps the first 3D geometry curve to the first and second intersection points.

9. The non-transitory computer readable storage of claim 6, wherein the 2D sketching mode and the 3D geometry mode are repeatedly switched.

10. The non-transitory computer readable storage of claim 6, wherein, while in 3D geometry mode, the first sketch on the first 2D plane, the second sketch on the second 2D plane, the first 3D geometry curve, and the second 3D geometry curve comprises a network of 3D curves that define the 3D surface geometry of the 3D object.

\* \* \* \* \*